x 3052 H (2)

July 4, 1972 H. J. CAULFIELD 3,674,331

SPACE DIVISION MULTIPLEXED HOLOGRAPHIC APPARATUS

Filed Oct. 9, 1970 2 Sheets-Sheet 1

INVENTOR
HENRY JOHN CAULFIELD
BY
HP Terry
ATTORNEY

INVENTOR
HENRY JOHN CAULFIELD
BY
H P Terry
ATTORNEY

United States Patent Office 3,674,331

Patented July 4, 1972

3,674,331

SPACE DIVISION MULTIPLEXED HOLOGRAPHIC APPARATUS

Henry John Caulfield, Carlisle, Mass., assignor to Sperry Rand Corporation

Filed Oct. 9, 1970, Ser. No. 79,412
Int. Cl. G02b *27/00*
U.S. Cl. 350—3.5 1 Claim

ABSTRACT OF THE DISCLOSURE

Holographic apparatus including a plurality of spatially complementary sampling masks for space division multiplexing respective object signals in such a way that each recording is distributed throughout substantially the full area of the holographic storage medium. Individual masks are used for successively recording the various objects and the mask corresponding to a particular recording is used in playback apparatus for producing respective images of said objects.

BACKGROUND OF THE INVENTION

(1) Field of the invention

The present invention relates to holography and more particularly to the application of novel space division multiplexing techniques in holographic recording and image producing apparatus.

(2) Description of the prior art

In the present state of the holographic art, two basic techniques are employed for utilizing the extremely high information storage capacity of holographic media, namely space division multiplexing wherein each interference pattern, representative of a given object, is stored in a spatially distinct localized region of the recording medium, and space sharing multiplexing wherein a plurality of information signals are stored in superposed relation over the full area of the recording medium by virtue of providing discrete angular displacements between the reference and signal beams for successive recordings.

In the case of the prior art space division multiplexing technique, the resolution and hence the amount of information retrievable from the recordings is seriously degraded because of the reduced size of the individual holograms formed on the recording medium. In addition, the small size of the holograms limits the angular field of view and decreases parallax when viewing the images produced by reconstruction of the wavefronts. Localized space division multiplexing does have the advantage, however, of preserving signal to noise ratio independent of the number of recordings. This result obtains because both the signal and the noise are proportional to the area used in reconstructing the image.

In the case of space sharing multiplexing, on the other hand, the signal to noise ratio decreases as the number of recordings increases. In this instance, the area of the hologram contributing to the noise and hence the noise itself remains constant independent of the number of recordings. Each recording, however, can utilize only 1/Nth of the dynamic exposure range of the storage medium and consequently the diffraction efficiency of the holograms is proportionately diminished. The result of constant noise and decreased signal strength or image brightness, owing to the reduced diffraction efficiency, thus accounts for the reduction in signal to noise ratio. A further disadvantage of the space sharing technique is that it is not readily practiced with conventional photographic film inasmuch as substantially thicker recording media are generally required to achieve the requisite angular resolution sensitivity to assure that the respective images can be independently reproduced. Since the full area of the recording medium is used for each recording, however, the space sharing techniques does have the advantage of good resolution.

It is an object of the present invention to provide a multiplexing technique which retains the advantages of both prior art techniques, namely high resolution and high signal to noise ratio as well as enlarged angular field of view and greater parallax when viewing the reconstructed images. This is accomplished by means of a space division multiplexing technique utilizing a set of discrete spatially complementary sampling masks for obtaining physically segregated recorded interference patterns, each of which is distributive over the full aperture of the recording medium. The inventive sampling technique therefore incorporates the principles of space sharing in the sense that each recording is distributed over the full area of the storage medium thereby affording good resolution, but in actuality the recordings are space divided by virtue of the sampling points of each recording being made spatially distinct from those of all the other recordings. In this way the area of the undivided holograms, although distributed over a large area, nevertheless diminishes as the number of recordings increases and thus high signal to noise ratio is also realized. Hence, the beneficial features of both prior art techniques are achieved. Moreover, selection of the sampling points of each mask in the manner to be described hereinafter optimizes the sampling process in that good approximations are achieved without the necessity for using an unwieldy or impractically large number of sampling points.

SUMMARY OF THE INVENTION

A preferred embodiment of the present invention for space division multiplexed recording of various objects comprises a plurality of spatially complementary sampling masks each having an array of transparent segments distributed throughout an area corresponding to the full aperture of the storage medium. In the recording apparatus individual masks are positioned immediately in front of the storage medium in the path of both the object and reference beams which are incident thereon in superposed relation at a predetermined angular displacement. Other positions of the sampling masks and the inclusion of additional masks for recording various objects is also permissible within certain constraints that will be explained more fully in the subsequent detailed description of the preferred embodiments.

Playback or reconstruction of the object wavefronts for the purpose of producing viewable images of any one of the recorded objects is accomplished simply by illuminating the holographic storage medium with an appropriately directed reference beam while the sampling mask corresponding to the desired object is positioned at the location it occupied during the recording procedure.

DESCRIPTION OF THE PREFERRED EMBODIMENT

Figure 1:
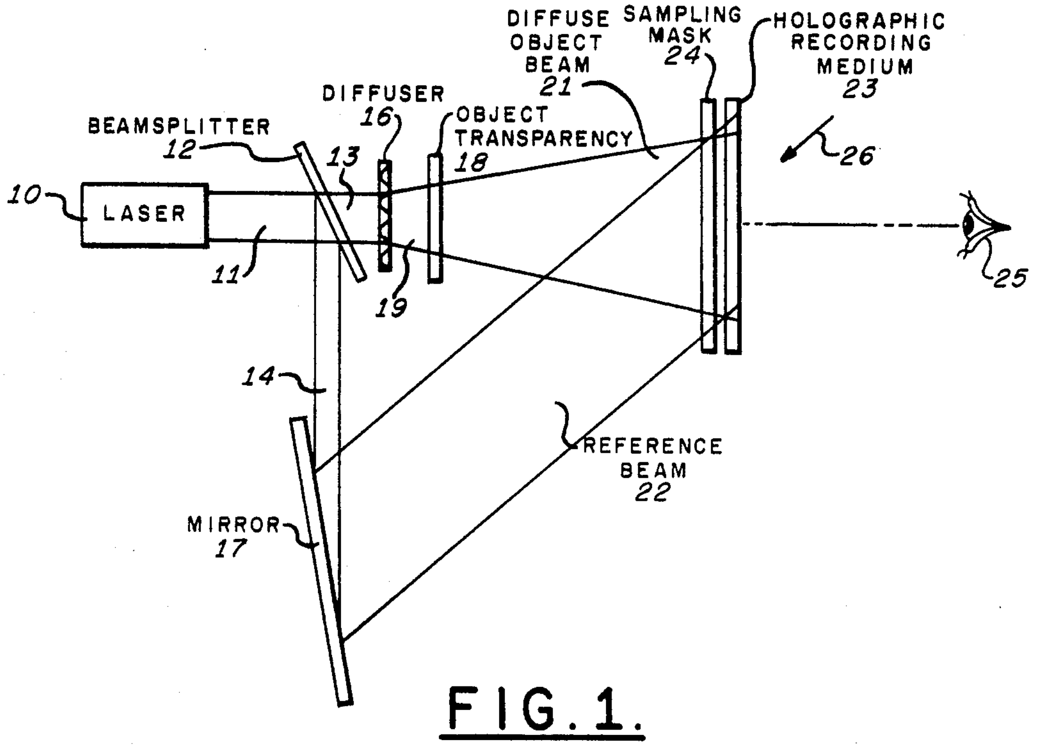
FIG. 1 is a schematic of recording apparatus embodying the principles of the present invention.

Referring to FIG. 1, apparatus for recording data holographically in accordance with the sampling principles of the present invention comprises a laser 10 emitting collimated light beam 11 which impinges on beam splitter 12 to form substantially equal intensity light beams 13 and 14 directed respectively at diffuser 16 and high reflectivity mirror 17. A transparency 18 carrying the data or information desired to be recorded is located behind the diffuser in the path of diffuse light beam 19. Upon propagating through the transparency, the wavefront of the diffuse beam is altered so as to form object beam 21 which is uniquely representative of the transparency data. It will be understood, of course, that the diffuser is not needed in those instances where the transparency or other object used in place thereof is capable itself of providing a suitably diffuse object beam.

The light reflected from mirror 17 constitutes a reference beam 22 which although indicated as being collimated may also be either convergent or divergent as is well understood by those skilled in the art. The reference beam is angularly displaced from the central axis of the object beam in the customary manner and as indicated is made sufficiently wide so as to overlap substantially the entire object beam over the full aperture of recording medium 23 which may be conventional high resolution photographic film or other suitable recording media.

Space division multiplexing in the manner of the present invention to achieve simultaneous optimization of the recording resolution and signal to noise ratio is accomplished by means of sampling mask 24 positioned immediately in front of recording medium 23 in the path of both the object and reference beams. The recording is thus established as interference occurring between the object and reference beams in those regions of the storage medium located behind transparent segments of the sampling mask. It should be understood, though, that the sampling masks can be positioned elsewhere other than directly in front of the recording medium. The masks, of course, must be located in the path of the object beam but if desired, for one reason or another, can be placed to the left of the indicated position at some point intermediate the transparencies and recording medium. The essential requirement is that the mask be positioned in accordance with the size and number of its transparent segments and the diffuseness of the object beam so that light rays from each point of the object strike at least several transparent segments. In other words, the light distribution must be fairly uniform in the sampling plane to assure that the sampling does not destroy the images during reconstruction. In the case where the masks are somewhat remote from the recording medium the respective recorded object wavefronts overlap to some extent resulting in degraded signal strength. On the other hand, when the masks are placed immediately adjacent the recording medium, the spatially complementary masks provide physically segregated interference patterns which have high diffraction efficiency and inherently higher signal to noise ratio and, in addition, afford the advantage of further signal to noise ratio enhancement as a consequence of being able to reconstruct individual object wavefronts with appropriately shaped reconstructing reference beams without the use of a sampling mask. This is accomplished by the use of an addressing hologram as is more fully explained in U.S. patent application Ser. No. 79,578 filed concurrently herewith in the name of Henry John Caulfield and assigned to the assignee of the present invention.

Figure 2A:
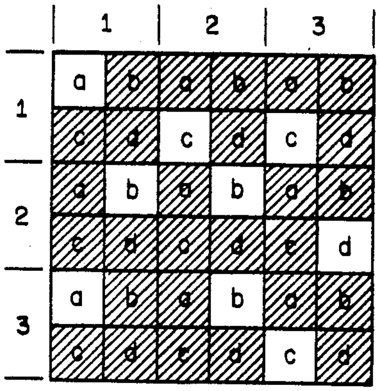
FIGS. 2*a–d* depict sampling masks used in the apparatus of FIG. 1.
Figure 2B:
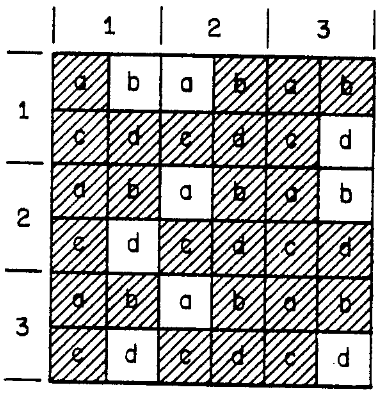
Figure 2C:
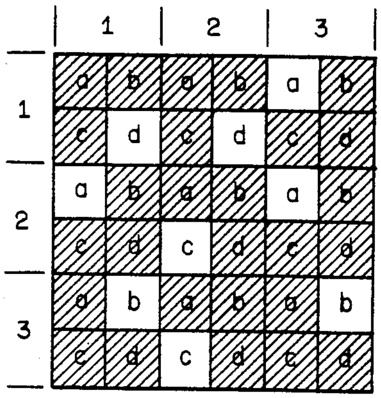
Figure 2D:
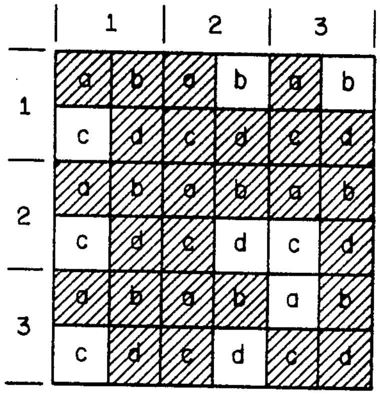

Illustrative sampling masks are indicated in FIGS. 2*a* to 2*d*. In actual practice, the number of sampling points in each mask would be substantially larger than indicated; but the principles of construction and operation can be adequately explained with the illustrative masks. Referring to FIG. 2*a*, consider each mask as containing three columns indicated by numerals 1 to 3 at the top of the masks and three rows indicated by numerals 1 to 3 at the left side of the masks. Each row-column intersection may be further divided into 4 subsections *a, b, c, d*. To construct a mask, one of the subsections *a, b, c, d* of each row-column intersection is selected to be transparent while the remaining subsections are made opaque to light of the particular wavelength emitted by laser 10, the clear subsections being indicative of the transparent segments in the illustrative masks. The same procedure is followed for making each mask. Preferably, the selection of the transparent segment from the subsections of each row-column intersection should be made at random and, more importantly, the selections for each mask should only be made from those subsections not selected for previously constructed masks. More specifically, if, for example, in row-column intersections 1-1 and 1-2, subsections *a* and *c* have been selected to be transparent, then in constructing the second mask (FIG. 2*b*) the transparent section for intersection 1-1 should be selected from subsections *b, c* and *d*, while those in intersection 1-2 should be selected from subsections *a, b* and *d*, and so on for all the other row-column intersection regions. Likewise, if in constructing the second mask, subsections *b* and *a* respectively are selected to be transparent in row-column intersections 1-1 and 1-2, then for construction of the third mask the transparent sections for these row-column intersections should be selected respectively from subsections *c* and *d*, and *b* and *d*. This is the procedure that has been followed in constructing the 4 illustrative masks as can be readily ascertained by scrutinizing the figures. In this way, the transparent segments of each mask are randomly distributed over the full aperture of the mask in unique spatial locations separate and distinct from all the other masks so that no one subsection is shared by any two masks. Some space sharing of the subsections is tolerable, of course, but it should be minimized to preclude degradation of the system performance in recording the holograms and reconstructing the image-producing wavefronts. Uniform selection of the transparent segments is also possible, for example, subsection *a* of each row-column intersection region could be selected as the transparent segment of mask 1, subsection *b* of each row-column intersection region selected for mask 2 and so on; but substantially better results are achieved with the aforedescribed controlled random selection which has the further advantage of requiring considerably fewer sampling points for achieving a given optical quality of the reconstructed images or alternatively providing superior optical quality with a predetermined number of sampling points. It will be appreciated that inasmuch as each row-column intersection contains only 4 subsections in the illustrative examples, that only 4 discrete space division multiplexed mask patterns can be made. Larger number of such subsections, of course, permit more masks to be made. It should also be understood that the number of row-column intersections can be made different from the number of subsections incorporated in each intersection region.

Recording of a plurality of object transparencies with the masks of FIGS. 2*a*–2*d* incorporated in the apparatus of FIG. 1 is performed simply by placing successive masks in position as indicated for recording the various objects. Alternatively, the successive masks may be used for recording respective holograms of a single object viewed in various perspectives for the purpose of reducing laser speckle, that is, for speckle averaging. Another interesting application of the invention relates to the elimination of cross-talk in Fourier transform holograms. In this instance, the complementary sampling masks each correspond to a point or region of a given object aperture. Since each object point is individually recorded, such that the interference patterns representative of the various points are physically segregated, no interference occurs between the various points and thus cross-talk is eliminated.

Reconstruction of the holographic wavefronts for producing images of the recorded objects can be accomplished simply by removing the diffuser and object transparency and replacing the beam splitter with a mirror so that a reference beam is provided the same as for recording. Operation in this manner produces a virtual image of the recorded object at the original position thereof viewed looking through the holographic medium from position 25. It will be understood, of course, that reconstruction in this way can be performed only if the sampling masks were positioned next to the storage medium during recording. In the case where the masks were somewhat remote from the storage medium during recording, only real images can be produced during playback. This is done by placing a viewing screen at the original position of the object and propagating the reference beam in the direction of arrow 26 opposite to its recording direction, the image again being viewed looking through the holographic medium from position 25. This reconstruction technique is also applicable where the masks were directly adjacent the holographic medium during recording and in this case it is immaterial whether the mask is on the front or rear side of the holograms. In either case, whether real or virtual images are produced, the constraining limitations, which are well known to those skilled in the art, regarding the reconstructing reference beam characteristics such as wavelength, wavefront curvature and angle of incidence on the recording medium must be duly considered.

For reconstruction of either real or virtual images, it will be apparent that illumination of the holographic recording medium over its full aperture will simultaneously reconstruct all the wavefronts recorded thereon and provide corresponding superposed images. Consequently, the individual images may or may not be discernible depending on the complexity and number thereof stored on the recording medium. To view any one image independent of the others, the related sampling mask must be positioned in essentially the same position it occupied during recording with the exception of the above-noted situation in which the mask placement is inconsequential.

Figure 3:
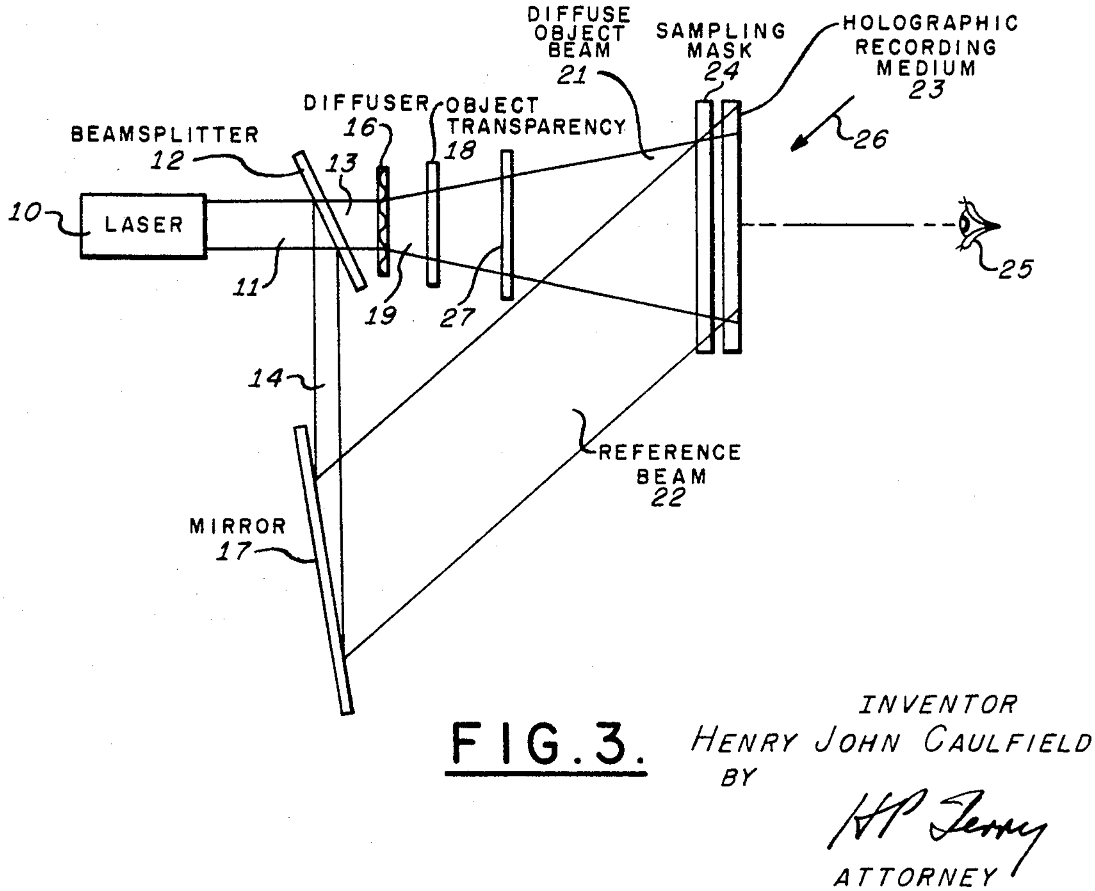
FIG. 3 is a schematic of an alternative recording apparatus including two sampling masks for the recording of each object.

The recording apparatus can be modified as indicated in FIG. 3 which is identical to FIG. 1 except for the inclusion of an additional sampling mask 27 which is also required to be positioned in the path of the diffuse object beam 21. This two-mask technique is particularly useful where numerous samples are desired to be taken. For instance, if 100 different samples are desired, two sets of masks each including 10 masks, for a total of 20 masks, will suffice as compared to needing 100 masks to obtain the 100 samples with a single mask apparatus. In all other respects, the construction and operation of the two-mask apparatus both as to recording and reconstruction is essentially the same as previously described for the single mask apparatus.

While the invention has been described in its preferred embodiment, it is to be understood that the words which have been used are words of description rather than limitation and that changes may be made within the purview of the appended claim without departing from the true scope and spirit of the invention in its broader aspects.

I claim:

1. Holographic apparatus for recording a plurality of space division multiplexed holograms comprising a holographic recording medium, means for producing coherently related reference and diffuse object light beams angularly separated from one another and directed onto the recording medium in at least partially superposed relation, first and second sets of sampling masks, each set including a plurality of spatially complementary sampling masks and each mask of both sets having a multiplicity of light transmissive sampling segments quasi-randomly distributed throughout a given area, said area being divided into a group of regularly arrayed sections, each section containing a group of subsections from which the sampling segments are selected, each mask having one light transmissive segment per section, each sampling segment of a first mask of both sets being randomly selected from one of the subsections of each section and each sampling segment of each succeeding mask of both sets being selected from one of the subsections of each section exclusive of the subsections selected for preceding masks such that spatially distinct subsections constitute the light transmissive sampling segments of the respective masks of both sets whereby the sampling segments of any one mask of the first set in combination with the sampling segments of any one mask of the second set define a unique area on the recording medium, and an individual mask of each set positioned in tandem relation in the path of the diffuse object beam for each recording, the spacing of the tandemly arranged masks relative to one another and to the object to be recorded being selected in accordance with the size and separation of the sampling segments and diffuseness of the object beam so that light from each of various points on the object to be recorded passes through a plurality of the sampling segments of each of the tandemly arranged masks, whereby by successively using each sampling mask of the first set in combination with each sampling mask of the second set distinct interference patterns representative of respective objects may be recorded.

References Cited

UNITED STATES PATENTS

| | | | |
|---|---|---|---|
| 3,567,305 | 3/1971 | Collier et al. | 350—3.5 |
| 2,803,178 | 8/1957 | Lotz | 350—Dig. 1 |

DAVID SCHONBERG, Primary Examiner

R. J. STERN, Assistant Examiner

U.S. Cl. X.R.

350—Dig. 1